United States Patent
Miyashita

(10) Patent No.: US 6,906,693 B1
(45) Date of Patent: Jun. 14, 2005

(54) LIQUID CRYSTAL DISPLAY DEVICE UTILIZING A LIGHT-ADMISSION WINDOW

(75) Inventor: Mamoru Miyashita, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 126 days.

(21) Appl. No.: 09/695,917

(22) Filed: Oct. 26, 2000

(30) Foreign Application Priority Data

Oct. 26, 1999 (JP) .......................................... 11-303302

(51) Int. Cl.⁷ ................................................ G09G 3/36
(52) U.S. Cl. ..................................................... 345/102
(58) Field of Search ............................ 345/102, 87, 88, 345/104, 94, 50, 51, 52, 38; 348/333.01, 333.02, 333.03, 333.04, 333.06, 687, 602, 603, 656, 647, 649, 645, 188, 96

(56) References Cited

U.S. PATENT DOCUMENTS

| | | | | |
|---|---|---|---|---|
| 5,179,437 A | * | 1/1993 | Kawada et al. | ............. 348/188 |
| 5,461,429 A | * | 10/1995 | Konishi et al. | ............. 348/656 |
| 5,729,289 A | * | 3/1998 | Etoh | ..................... 348/333.02 |
| 5,739,859 A | * | 4/1998 | Hattori et al. | ......... 348/333.06 |
| 5,748,237 A | * | 5/1998 | Ueda et al. | .................. 345/102 |
| 5,751,343 A | * | 5/1998 | Hibino et al. | .................. 348/96 |

* cited by examiner

Primary Examiner—Chanh Nguyen
(74) Attorney, Agent, or Firm—Birch, Stewart, Kolasch & Birch, LLP

(57) ABSTRACT

Image data that has been recorded on a memory card inserted into a digital still camera is read out. When a light-admission switch is turned on, an amount of correction suited outdoor use of the camera is set. A light-admission window opens so that the back side of a liquid crystal display panel is illuminated by outside light allowed to enter from the light-admission window. As a result, an image corrected based upon the amount of correction set for outdoor use of the camera is displayed. This makes it easier to see an image displayed on the liquid crystal display panel even when the camera is used outdoors.

12 Claims, 7 Drawing Sheets

Fig. 5

|          | GAMMA CORRECTION | LUMINANCE LEVEL | CONTOUR CORRECTION | HUE | COLOR SATURATION |
|----------|------------------|-----------------|--------------------|----|------------------|
| OUTDOORS | INCREASE | INCREASE | EMPHASIZE | BLUISH | INCREASE |
| INDOORS | STANDARD | STANDARD | STANDARD | STANDARD | STANDARD |

LIQUID CRYSTAL DISPLAY DEVICE UTILIZING A LIGHT-ADMISSION WINDOW

BACKGROUND OF THE INVENTION

1. Field of the Invention

This invention relates to a liquid crystal display device having a case formed to include a light-admission window for admitting outside light, and to a method of controlling this device.

2. Description of the Related Art

A digital still camera has a back side provided with a display screen of a liquid crystal display device for displaying a sensed image. The camera angle can be decided while the image of the subject is being displayed on the display screen.

A liquid crystal display device usually is provided with a backlighting device. The backlighting device illuminates the back side of a liquid crystal display panel constituting the liquid crystal display device. A battery can be used as the power source of the digital still camera taking into consideration the need for portability. The backlighting device is driven using the battery as the power source.

In response to the demand for reduced power consumption, a digital still camera formed to include a light-admission window for the purpose of allowing admission of outside light has become available. When the digital still camera is used outdoors, the light-admission window is opened so that outside light admitted from the window will be introduced to the back side of the liquid crystal display panel. Turning off the backlighting device at such time makes it possible to conserve power.

However, just because outside light is allowed to enter from the light-admission window and the admitted light is introduced to the back side of the liquid crystal display panel does not necessarily mean that the image being displayed by the liquid crystal display device will be easy to see.

DISCLOSURE OF THE INVENTION

Accordingly, an object of the present invention is to make it easy to see an image being displayed by a liquid crystal display device.

According to the present invention, the foregoing object is attained by providing a liquid crystal display device having a case internally accommodating a liquid crystal display panel which displays an image represented by an applied image signal, the liquid crystal display panel having a display screen exposed externally of the case, the case being formed to include a freely openable and closable light-admission window for admitting outside light, and a light guiding path being formed for introducing the outside light, which has been admitted by opening the light-admission window, to the underside of the liquid crystal display panel, liquid crystal display device comprising: a backlighting device for projecting backlight toward the underside of the liquid crystal display panel; a setting unit for setting whether to admit outside light from the light-admission window or to project backlight from the backlighting device; a signal correction circuit (signal correction means) for subjecting the applied image signal to a correction for outdoor display in response to a setting by the setting unit for admission of the outside light; and a backlight control circuit for turning on the backlighting device in response to a setting by the setting unit for projection of the backlight.

The present invention provides also a method of controlling the above-described device. Specifically, the present invention provides a method of controlling a liquid crystal display device having a case internally accommodating a liquid crystal display panel which displays an image represented by an applied image signal, the liquid crystal display panel having a display screen exposed externally of the case, the case being formed to include a freely openable and closable light-admission window for admitting outside light, a light guiding path being formed for introducing the outside light, which has been admitted by opening the light-admission window, to the underside of the liquid crystal display panel, and a backlight device being provided for projecting backlight toward the underside of the liquid crystal display panel, the method comprising the steps of: making it possible to set whether to admit outside light from the light-admission window or to project backlight from the backlighting device; subjecting the applied image signal to a correction for outdoor display in response to a setting for admission of the outside light; and turning on the backlighting device in response to a setting for projection of the backlight.

In accordance with the present invention, when a setting is made to admit outside light from the light-admission window, the light-admission window is opened to introduce the outside light to the back side of the liquid crystal display panel. An applied image signal (which may be either an analog video signal or digital image data) is corrected to a signal for outdoor display purposes. The corrected image signal is applied to the liquid crystal display device so that the image represented by the image signal is displayed.

When a setting is made to project backlight, the light-admission window is closed and the back side of the liquid crystal display panel is illuminated by the backlighting device. Since the back side of the liquid crystal display panel is illuminated by the backlighting device indoors, an easy-to-see image is displayed.

When outside light is allowed to enter from the light-admission window, the image signal is corrected to one for an outdoor display. An image that is easy to see outdoors is displayed. Examples of corrections are a gamma correction, luminance correction, contour correction, hue correction and color saturation correction. When a setting is made to allow admission of outside light from the light-admission window outdoors, for example, consumption of power can be reduced because the backlighting device is turned off.

The liquid crystal display device may be provided with an output circuit for making a connection to an external display unit that displays the image represented by the applied image signal and that is removably attached to the liquid crystal display device. In such case it is desirable that the output circuit be turned off in response to a setting by the setting unit for admission of outside light.

In a case where outside light is admitted, the camera often is located outdoors. Instances in which the external display unit is connected outdoors are comparatively few. Accordingly, by turning off the output circuit that connects the external display unit, wasteful consumption of power can be prevented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 illustrates the difference between outdoor and indoor correction amounts;

DESCRIPTION OF THE PREFERRED EMBODIMENT

An embodiment of the present invention will now be described in detail.

Figure 1:
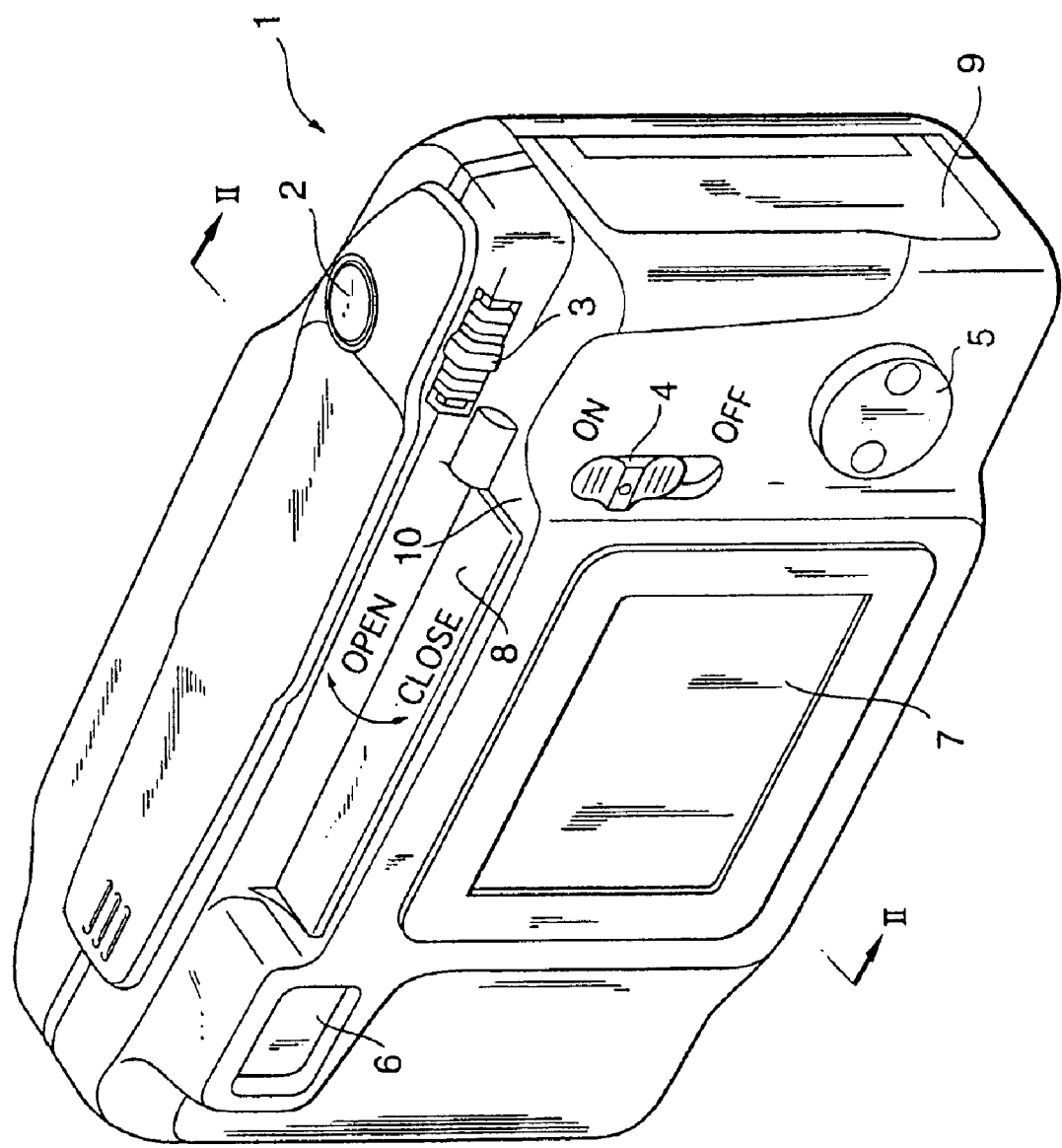
FIG. 1 is a perspective view of a digital still camera as seen from the back side thereof.

FIG. 1, which illustrates an embodiment of the present invention, is a perspective view of a digital still camera 1 as seen from the back side thereof.

The digital still camera 1 has a case the back side of which is provided with a liquid crystal display panel 7 substantially at the center thereof. The liquid crystal display panel 7 displays the image of a subject obtained by photography or an image represented by image data that has been recorded on a memory card. As will be described later, the back side of the liquid crystal display panel 7 is illuminated by light projected from a backlighting device.

An optical viewfinder 6 is formed at the upper left of the liquid crystal display panel 7. The user can decide the camera angle while observing the image of a subject being displayed on the liquid crystal display panel 7 and can also decide the camera angle by viewing the subject through the optical viewfinder 6. Formed at the lower right of the liquid crystal display panel 7 is a mode setting button 5 for setting various modes such as a picture-taking mode and playback mode.

A light-admission switch 4 for the liquid crystal display panel 7 is provided at the upper right of the liquid crystal display panel 7. Turning the light-admission switch 4 off results in the backlighting device being turned on to illuminate the back side of the liquid crystal display panel 7 with light.

The top of the digital still camera 1 is provided with a light-admission cover 8 on the back side thereof (the portion on the back side of the camera is indicated at numeral 10). The light-admission cover 8 is opened by turning on the light-admission switch 4 and is closed by pushing it with a finger when it is open. If the light-admission cover 8 is opened, a light-admission window is exposed. When the light-admission window is exposed, outside light is allowed to enter from the light-admission window and is introduced to the back side of the liquid crystal display panel 7, as will be described later.

A power switch 3 is provided on the back of the digital still camera 1 on the right side thereof near the top. A shutter-release button 2 is provided on the top of the digital still camera 1 on the right side thereof near the front.

The left side (the near side in FIG. 1) of the digital still camera 1 is formed to include a freely openable and closable card cover 9. When the card cover 9 is opened, a recess for accommodating a memory card appears. A memory card is removably received within the recess.

The right side (the far side in FIG. 1) of the digital still camera 1 is formed to include an output terminal for making a connection to an external television unit.

Figure 2:
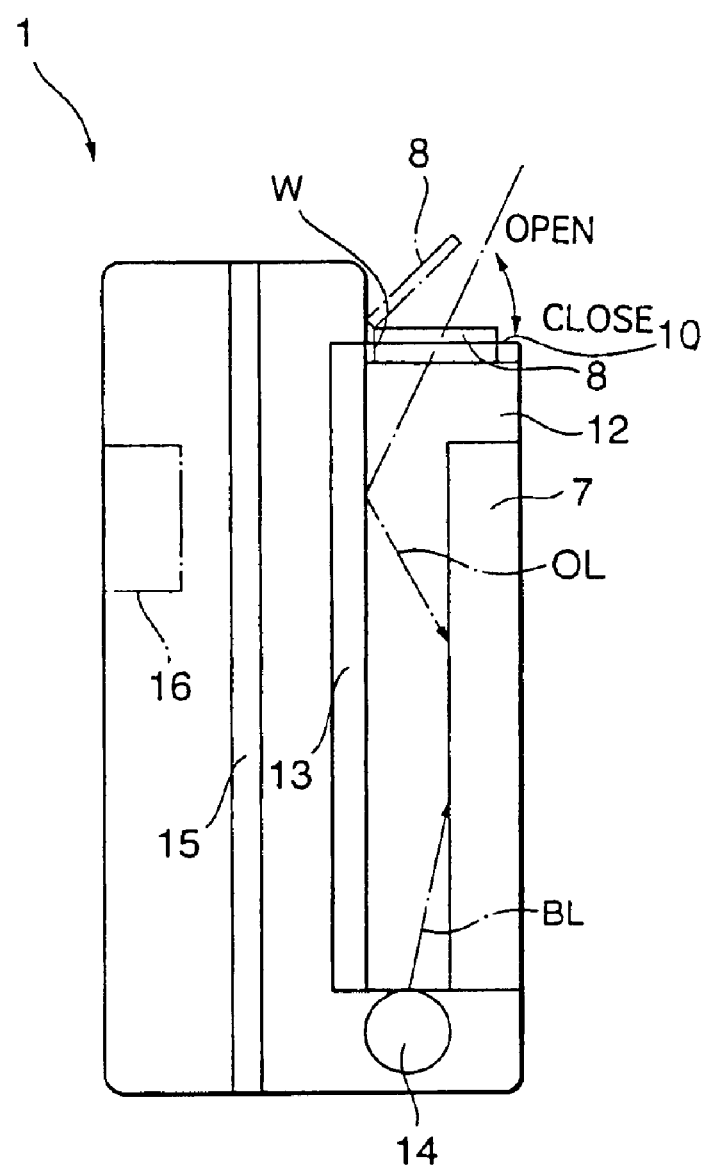
FIG. 2 is a sectional view taken along line II—II in FIG. 1.

FIG. 2 is a cross-sectional view taken along line II—II of FIG. 1.

The back side of the liquid crystal display panel 7 is provided with an acrylic plate 12. A reflecting sheet 13 is affixed to the back side of the acrylic plate 12 (the side of the plate opposite the liquid crystal display panel 7). A backlight 14 is disposed below the acrylic plate 12.

Light BL projected from the backlight 14 illuminates the back side of the liquid crystal display panel 7. If the light-admission cover 8 is opened, outside light OL is allowed to enter from a light-admission window W. The admitted outside light OL passes through the acrylic plate 12 and is introduced to the reflecting sheet 13. The outside light OL is reflected by the reflecting sheet 13 and illuminates the back side of the liquid crystal display panel 7.

The digital still camera 1 includes also a circuit board 15 on which a circuit, described later, has been formed. A light image representing the image of a subject is formed on the photoreceptor surface of an image sensing device, which has been disposed on the circuit board 15, by an imaging lens unit 16, whereby image data representing the image of the subject is obtained.

Figure 3:
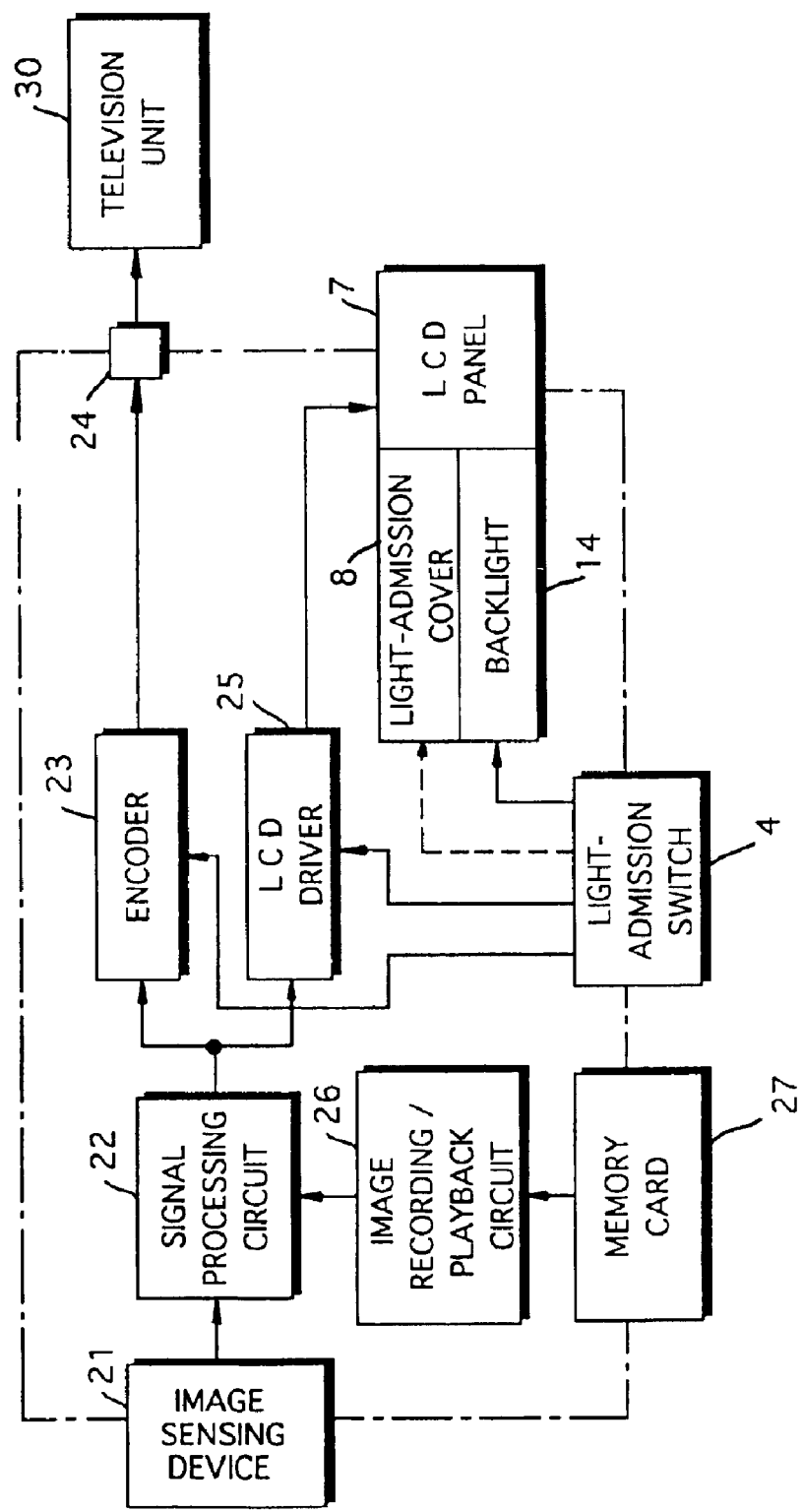
FIG. 3 is a block diagram illustrating the electrical construction of the digital still camera.

FIG. 3 is a block diagram illustrating the electrical construction of the digital still camera 1.

The digital still camera 1 according to this embodiment is such that if the light-admission switch 4 is turned off, it is construed that the camera will be used indoors and, hence, the backlight 14 is turned on. The latter illuminates the back side of the liquid crystal display panel 7 in the manner described above. Thus, a bright image is displayed on the liquid crystal display panel 7 even though the camera is used indoors. If the light-admission switch 4 is turned on, use outdoors is construed and the light-admission cover 8 pens. When this occurs, outside light is introduced from the light-admission window and illuminates the back side of the liquid crystal display panel 7. In addition, the backlight 14 is turned off. Thus, even though the backlight 14 is turned off, a comparatively bright image is displayed on the liquid crystal display panel 7 by utilizing the outside light.

If the light-admission switch 4 in the digital still camera 1 according to this embodiment is turned on, image data representing the image of a subject is corrected so as to be suitable for display outdoors. Though there are instances where an image is difficult to see outdoors, a comparatively easy-to-see image is displayed on the liquid crystal display panel 7 by virtue of the correction applied to the image data. This processing will be described later in detail.

A signal indicating whether the light-admission switch 4 is on or off is applied to an encoder 23, an LCD (Liquid Crystal Display) driver 25 and the backlight 14. Further, turning off the light-admission switch 4 causes the light-admission cover 8 to open.

If the picture-taking mode is set by the mode setting button 5 (not shown in FIG. 3), the subject is photographed by an image sensing device 21. A video signal representing the image of the subject is output from the image sensing device 21 and enters a signal processing circuit 22.

The signal processing circuit 22, which includes an analog/digital conversion circuit, a gamma correction circuit and a circuit for generating luminance data and color difference data, executes prescribed signal processing. Image data is output from the signal processing circuit 22 and is applied to the encoder 23 and LCD driver 25.

The image data is supplied from the LCD driver 25 to the liquid crystal display panel 7, whereby the image of the subject is displayed on the liquid crystal display panel 7.

The image data that has entered the encoder 23 is subjected to prescribed encoding processing so as to be displayable on the television. Image data output from the encoder 23 is applied to a television unit 30 via an output terminal 24. The image of the subject is displayed on the display screen of the television unit 30. The encoder 23 can be controlled so as to be turned on and off. The encoder 23 is turned off when the light-admission switch 4 is turned on. When the light-admission switch 4 is turned on, it is construed that the camera will be used outdoors. The encoder 23 is turned off because it is considered rare for the television unit 30 to be connected to the camera 1 outdoors.

If the shutter-release button 2 (not shown in FIG. 3) is pressed, image data output from the signal processing circuit 22 enters an image recording/playback circuit 26. The latter executes data compression processing and other recording processing. Image data output from the image recording/playback circuit 26 is applied to a memory card 27 on which the image data is then recorded.

The digital still camera 1 according to this embodiment has a playback function as well.

If the playback mode is set by the mode setting button 5, image data that has been recorded on the memory card 27 is read out and applied to the image recording/playback circuit 26. The latter executes processing for decompressing compressed image data as well as other playback processing and inputs the processed image data to the signal processing circuit 22.

Image data output from the signal processing circuit 22 is applied to the LCD driver 25 and encoder 23. A reproduced image is then displayed on the liquid crystal display panel 7 and on the display screen of the television unit 30 in a manner similar to that when a subject is photographed.

Figure 4:
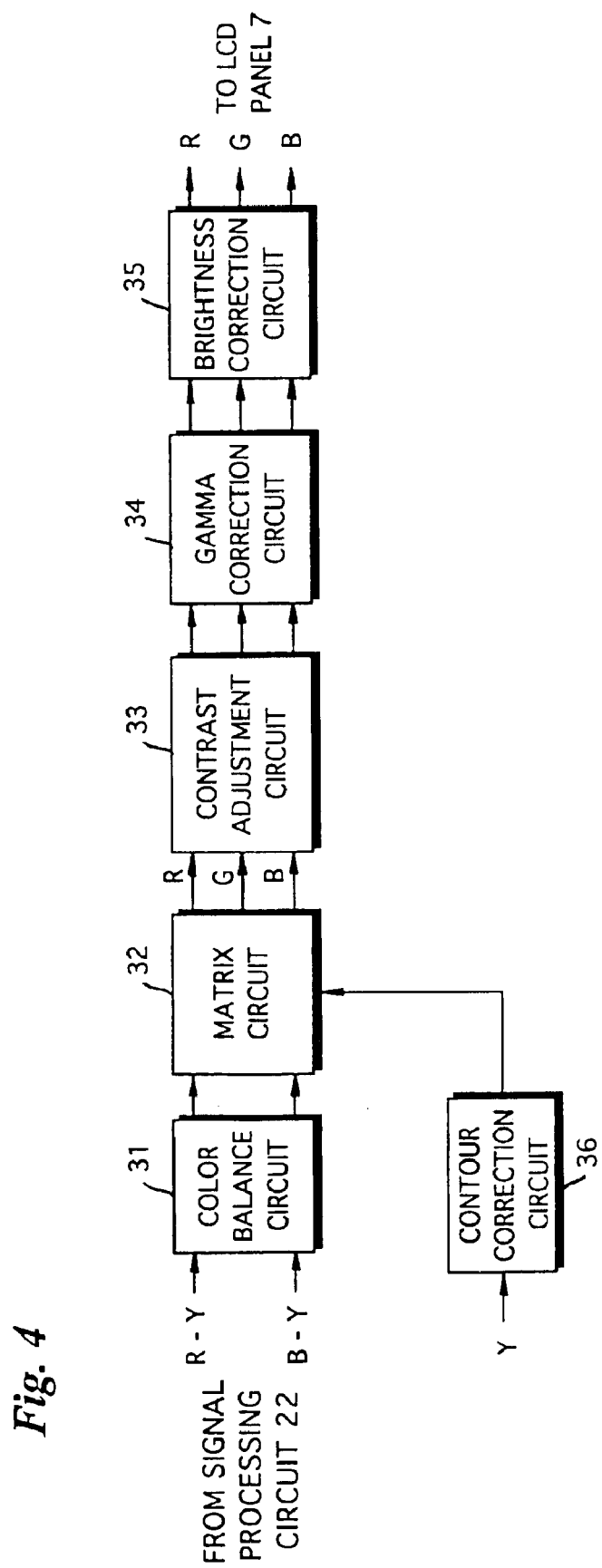
FIG. 4 is a block diagram illustrating the electrical construction of an LCD driver.

FIG. 4 is a block diagram illustrating the electrical construction of the LCD driver 25.

R-Y and B-Y color difference data contained in the image data output from the signal processing circuit 22 is input to a color balance circuit 31, and luminance data Y contained in the image data is input to a contour correction circuit 36.

The color balance circuit 31 subjects the entered color difference data to hue correction processing (processing which corrects the level of the color difference data) and to a color saturation correction (a bluish or reddish correction). Color difference data output from the color balance circuit 31 is applied to a matrix circuit 32.

The contour correction circuit 36 applies contour correction processing to the entered luminance data and outputs the processed luminance data. The luminance data output from the contour correction circuit 36 also is input to the matrix circuit 32.

The matrix circuit 32 generates image data of the three primary colors R, G, B from the applied color difference data and luminance data. The generated image data is input to a contrast adjustment circuit 33, which adjusts the contrast of the image data. The image data output from the contrast adjustment circuit 33 enters a gamma correction circuit 34, which implements a gamma correction conforming to the gamma characteristic of the liquid crystal display panel 7. The gamma-corrected image data is input to a brightness correction circuit 35, where the luminance level is adjusted. More specifically, since G (green) data is regarded as being equivalent to the luminance level, the level of the green data would be adjusted. Image data output from the brightness correction circuit 35 is applied to the liquid crystal display panel 7, as mentioned above.

FIG. 5 illustrates the manner in which the amount of correction applied to image data is changed between outdoor and indoor use as described earlier.

In this embodiment, the amounts of correction involved in gamma correction (gamma correction circuit 34), luminance level correction (brightness correction circuit 35), contour correction (contour correction circuit 36), hue correction (color balance circuit 31) and color saturation correction (color balance circuit 31) are changed. The amounts of correction are all set to predetermined standard values for indoor use of the camera. When the camera is used outdoors, on the other hand, the gamma correction, luminance level correction and color saturation correction are all changed so as to increase from the standard values. The contour correction is changed to provide greater emphasis than the standard value, and hue is corrected so as to obtain a more bluish color (the level of the R-Y color difference data increased).

By thus changing amount of correction when the camera is used outdoors, the image displayed on the liquid crystal display panel 7 becomes easy to see even outdoors.

FIGS. 6a to 6f illustrate the characteristics of the image data and gamma correction curves.

Figure 6A:
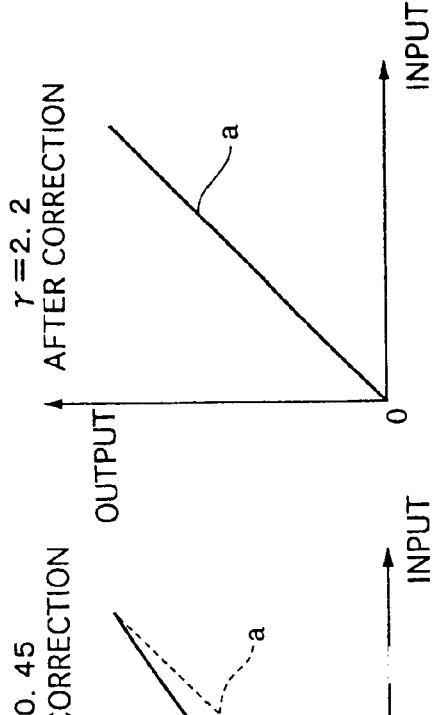
FIGS. 6a to 6f illustrate gamma correction curves and levels of image data.
Figure 6B:
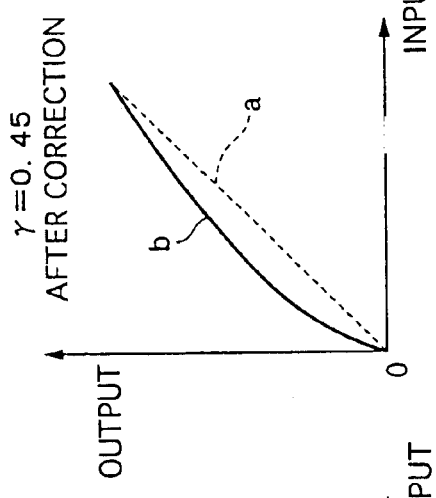
Figure 6C:
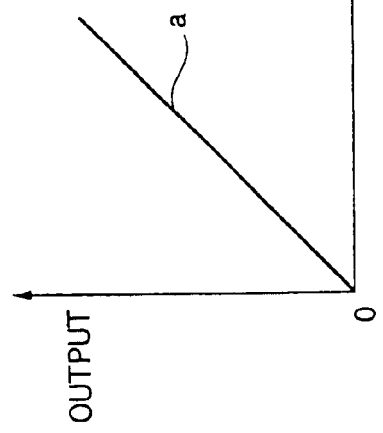
Figure 6D:
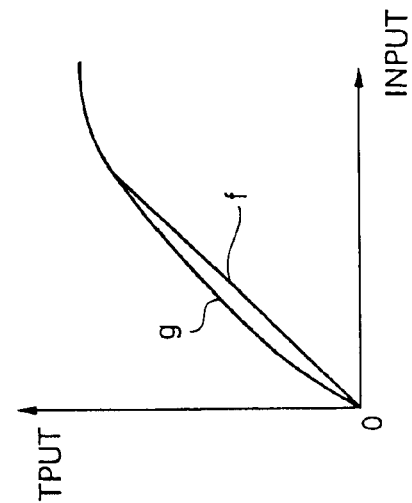

The characteristic of the image data obtained by the image sensing device 21 has linearity, as indicated by the solid line 51 in FIG. 6a. The gamma characteristic of the television unit is such that gamma=2.2 holds, and a suitable image cannot be displayed by the television even if the image data obtained by the image sensing device 21 is applied to the television unit. For this reason, the gamma correction circuit in the signal processing circuit 22 incorporated in the digital still camera 1 applies a gamma correction using a gamma correction curve 52 of gamma=0.45 (FIG. 6b). By applying image data that has been subjected to the gamma correction using the gamma correction curve for which gamma=0.45 holds to the television unit, image data having linearity is obtained, as indicated by the solid line 51 in FIG. 6c.

In the digital still camera 1 according to this embodiment, a gamma correction is applied in the LCD driver 25 as well (by the gamma correction circuit 34), as described earlier. In the gamma correction performed by the LCD driver 25, image data (indicated by the dashed line 52 in FIG. 6d) that has been gamma-corrected in the signal processing circuit 22 is subjected to a gamma correction as indicated by solid line 53 or 54 in FIG. 6d. The gamma correction is applied in such a manner that the amount of the gamma correction is made more for outdoor use than for indoor use, as set forth earlier. Accordingly, image data after application of the gamma correction for use of the camera indoors becomes as indicated by the solid line 53, and image data after application of the gamma correction for use of the camera outdoors becomes as indicated by the solid line 54.

Figure 6E:
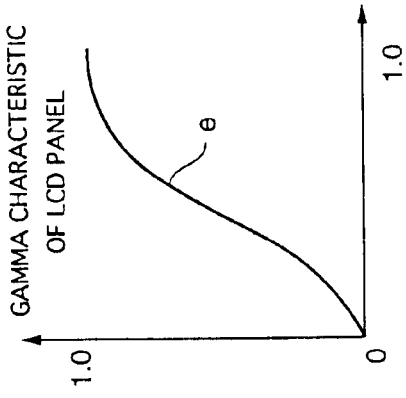
Figure 6F:
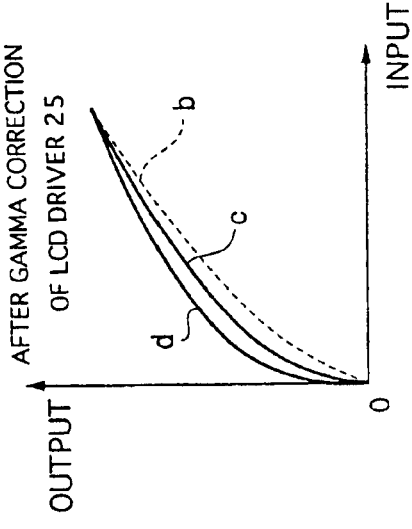

FIG. 6e illustrates the gamma characteristic of the liquid crystal display panel 7. By executing a gamma correction suited to the liquid crystal display panel 7 using the LCD driver 25, image data having a linear characteristic as indicated by the solid line 56 in FIG. 6f is obtained (in case of indoor use) when the image data is applied to the liquid crystal display panel 7. In case of outdoor use, the lower level is emphasized in comparison with indoor use, as indicated by solid line 57. Accordingly, an easy-to-see image is obtained even outdoors.

Figure 7:
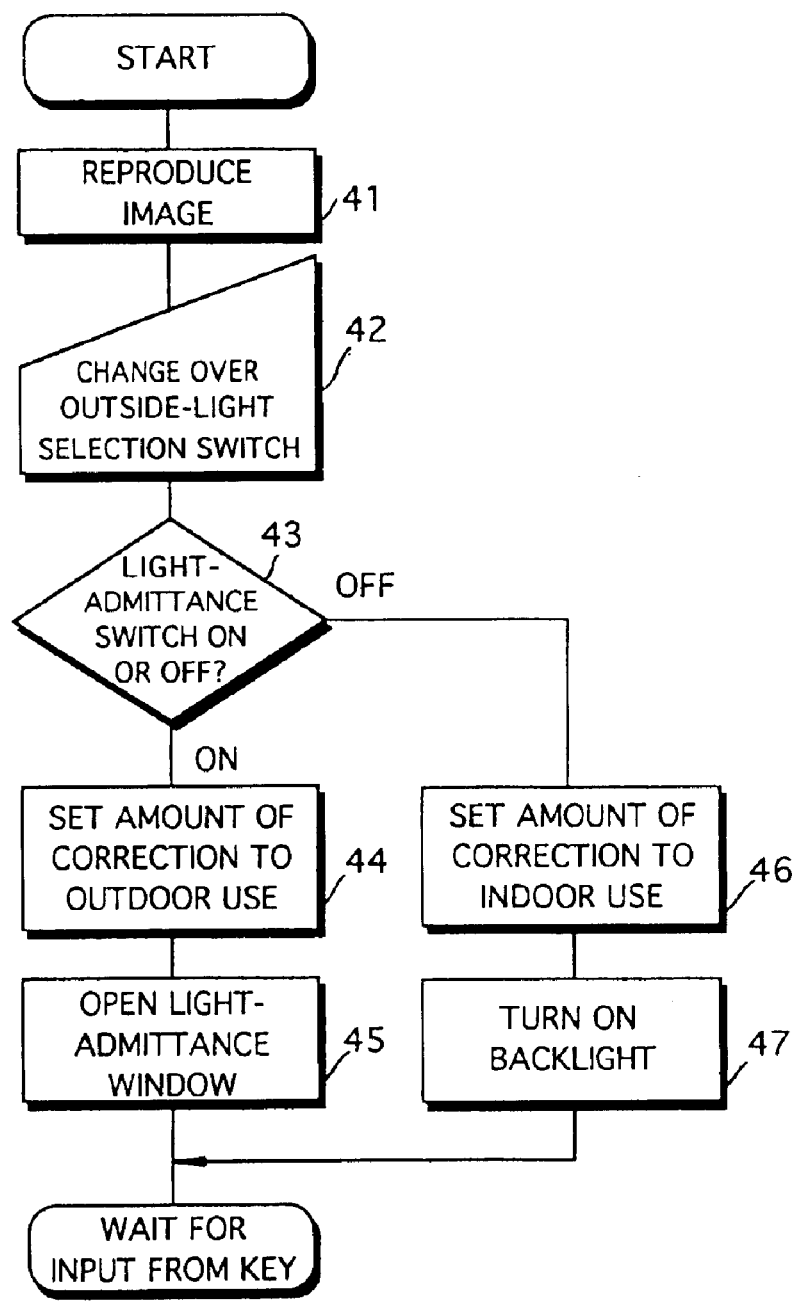
FIG. 7 is a flowchart illustrating processing executed by the digital still camera.

FIG. 7 is a flowchart illustrating processing executed by the digital still camera 1. Though this processing is processing concerning playback, it goes without saying that processing is executed in similar fashion also at the time of photography.

A memory card is loaded into the digital still camera 1 and image data is read out of the memory card. The read image data is input to the image recording/playback circuit 26 and is subjected to playback processing, which includes data decompression, as set forth earlier (step 41). The image data is output from the image recording/playback circuit 26 and enters the liquid crystal display panel 7 via the signal processing circuit 22 and LCD driver 25, as described above. The image represented by the image data that has been recorded on the memory card is displayed on the liquid crystal display panel 7.

The light-admission switch 4 is operated by the user (step 42). If the light-admission switch 4 is on (step 43), the amount of correction applied in the LCD driver 25 is set that for outdoor use of the camera, as described earlier (step 44). Further, the light-admission cover 8 opens and the encoder 23 is turned off (step 45). Outside light is admitted by the light-admission cover 8 and illuminates the back side of the liquid crystal display panel 7. Image data, which has been corrected by the set amount, enters the liquid crystal display panel 7. Since the image data displayed on the display screen of the liquid crystal display panel 7 has been corrected for display outdoors, the image is easy to see even when viewed outdoors.

If the light-admission switch 4 is turned off (step 43), an amount of correction suitable for camera use indoors is set (step 46) and the image data is corrected in accordance with the set amount of correction (step 46). Further, the backlight 14 turns on (step 47) and the liquid crystal display panel 7 is illuminated from its back side by the backlight 14 (step 47). As a result, the image displayed on the liquid crystal display panel 7 is easy to see even indoors.

As many apparently widely different embodiments of the present invention can be made without departing from the spirit and scope thereof, it is to be understood that the invention is not limited to the specific embodiments thereof except as defined in the appended claims.

What is claimed is:

1. A liquid crystal display device having a case internally accommodating a liquid crystal display panel which display an image represented by an applied image signal, said liquid crystal display panel having a display screen exposed externally of the case, said case being formed to include a freely openable and closable light admission window for admitting outside light, and a light guide path being formed for introducing the outside light, which has been admitted by opening said light-admission window, to the back side of said liquid crystal display panel, said liquid crystal display device comprising:

a backlight device for projecting backlight toward the back side of said liquid crystal display panel;
   a setting unit for setting whether to admit outside light from said light-admission window or to project backlight from said backlighting device;
   a signal correction circuit for subjecting the applied image signal for subjecting the applied image signal to at least one correction selected from the group consisting of a gamma correction, luminance correction, contour correction, hue correction, and color saturation correction to compensate for incident external light directly on the front surface of the liquid crystal display panel for outdoor display in response to a setting by said setting unit for admission of the outside light without projecting back light;
   a back light control circuit for turning on said backlight device in response to a setting by said setting unit for projection of the backlight;
   an output circuit for making a connection to an external display unit that displays the image represented by the applied image signal and that is removably attached to the liquid crystal display device; and
   an output-circuit control unit for turning said output circuit off in response to a setting by said setting unit for admission of outside light.

2. The liquid-crystal display device as set forth in claim 1, wherein the signal correction circuit subjects the applied image signal to gamma correction.

3. The liquid-crystal display device as set forth in claim 1, wherein the signal correction circuit subjects the applied image signal to luminance correction.

4. The liquid-crystal display device as set forth in claim 1, wherein the signal correction circuit subjects the applied image signal to contour correction.

5. The liquid-crystal display device as set forth in claim 1, wherein the signal correction circuit subjects the applied image signal to hue correction.

6. The liquid-crystal display device as set forth in claim 1, wherein the signal correction circuit subjects the applied image signal to color saturation correction.

7. A liquid crystal display device having a case internally accommodating a liquid crystal display panel which display an image represented by an applied image signal, said liquid crystal display panel having a display screen exposed externally of the case, said case being formed to include a freely openable and closable light admission window for admitting outside light, and a light guide path being formed for introducing the outside light, which has been admitted by opening said light-admission window, to the underside of said liquid crystal display panel, and a backlight device for projecting backlight toward the underside of said liquid crystal display panel, a method comprising the steps of:

making it possible to set whether to admit outside light from said light-admission window or to project backlight from said backlighting device;
   subjecting the applied image signal to at least one correction selected from the group consisting of a gamma correction, luminance correction, contour correction, hue correction, and color saturation correction to compensate for incident external light directly on the front surface of the liquid crystal display panel for outdoor display in response to a setting for admission of the outside light without projecting back light;
   turning on said backlight device in response to a setting for projection of the backlight;
   making a connection an output circuit to an external display unit that displays the image represented by the applied image signal and that is removably attached to the liquid crystal display device; and
   turning said output-circuit off by an output-circuit control unit in response to the setting by a setting unit for admission of outside light.

8. The liquid-crystal display device as set forth in claim 7, wherein the signal correction circuit subjects the applied image signal to gamma correction.

9. The liquid-crystal display device as set forth in claim 7, wherein the signal correction circuit subjects the applied image signal to luminance correction.

10. The liquid-crystal display device as set forth in claim 7, wherein the signal correction circuit subjects the applied image signal to contour correction.

11. The liquid-crystal display device as set forth in claim 7, wherein the signal correction circuit subjects the applied image signal to hue correction.

12. The liquid-crystal display device as set forth in claim 7, wherein the signal correction circuit subjects the applied image signal to color saturation correction.

* * * * *